United States Patent
Bairamian et al.

(10) Patent No.: US 12,422,921 B2
(45) Date of Patent: Sep. 23, 2025

(54) AUGMENTED REALITY POINT OF VIEW SYNCHRONISATION SYSTEM

(71) Applicants: Daniel Bairamian, Baulkham Hills (AU); David Bairamian, Baulkham Hills (AU)

(72) Inventors: Daniel Bairamian, Baulkham Hills (AU); David Bairamian, Baulkham Hills (AU)

(73) Assignees: Daniel Bairamian, Baulkham Hills (AU); David Bairamian, Baulkham Hills (AU)

( * ) Notice: Subject to any disclaimer, the term of this patent is extended or adjusted under 35 U.S.C. 154(b) by 0 days.

(21) Appl. No.: 18/846,829

(22) PCT Filed: Mar. 14, 2023

(86) PCT No.: PCT/AU2023/050175
§ 371 (c)(1),
(2) Date: Sep. 13, 2024

(87) PCT Pub. No.: WO2023/173162
PCT Pub. Date: Sep. 21, 2023

(65) Prior Publication Data
US 2025/0208695 A1  Jun. 26, 2025

(30) Foreign Application Priority Data
Mar. 14, 2022 (AU) .................. 2022900612

(51) Int. Cl.
G06F 3/0346 (2013.01)
G06F 3/01 (2006.01)
G06F 3/038 (2013.01)

(52) U.S. Cl.
CPC .............. *G06F 3/011* (2013.01); *G06F 3/017* (2013.01); *G06F 3/0346* (2013.01); *G06F 3/038* (2013.01)

(58) Field of Classification Search
CPC .. G06F 3/011–015; G06F 3/017; G06F 3/033; G06F 3/0346; G06F 3/038–0383
See application file for complete search history.

(56) References Cited

U.S. PATENT DOCUMENTS

| | | | |
|---|---|---|---|
| 8,537,113 B2 * | 9/2013 | Weising | G06F 3/012 715/810 |
| 8,717,294 B2 * | 5/2014 | Weising | A63F 3/02 345/158 |

(Continued)

FOREIGN PATENT DOCUMENTS

WO   2022006082 A1   1/2022

OTHER PUBLICATIONS

International Search Report & Written Opinion dated May 23, 2023 from PCT Application No. PCT/AU2023/050175, 10 pages.

(Continued)

*Primary Examiner* — Patrick F Marinelli
(74) *Attorney, Agent, or Firm* — INNOVATION CAPITAL LAW GROUP, LLP; Vic Lin (57) ABSTRACT

An augmented reality point of view synchronisation system has a VR headset having an augmented display and a controller operably interfacing the headset. The system is configured to sense variable relative rotational and positional offsets of the controller with respect to the headset. The system also has a cradle configured to position the controller at fixed relative rotational and positional offsets with respect to a physical model. The system is configured to augment a view of the physical model with a 3D virtual model using the augmented display wherein the point of (Continued)

view of the 3D virtual model is determined according to the variable and fixed relative rotational and positional offsets.

17 Claims, 7 Drawing Sheets

(56) References Cited

U.S. PATENT DOCUMENTS

| | | | | |
|---|---|---|---|---|
| 8,730,156 | B2* | 5/2014 | Weising | G06F 3/0304 |
| | | | | 348/47 |
| 9,310,883 | B2* | 4/2016 | Weising | A63F 13/00 |
| 9,513,700 | B2* | 12/2016 | Weising | G06F 3/017 |
| 10,424,077 | B2* | 9/2019 | Weising | A63F 3/02 |
| 10,535,153 | B2* | 1/2020 | Weising | G09G 5/08 |
| 11,244,469 | B2* | 2/2022 | Weising | G06F 3/012 |
| 2004/0174338 | A1* | 9/2004 | Scott | G06F 1/1632 |
| | | | | 345/156 |
| 2011/0216002 | A1* | 9/2011 | Weising | A63F 13/92 |
| | | | | 345/158 |
| 2011/0216060 | A1* | 9/2011 | Weising | A63F 13/00 |
| | | | | 345/419 |
| 2012/0010812 | A1* | 1/2012 | Thompson | G06F 1/1632 |
| | | | | 701/500 |
| 2012/0249587 | A1* | 10/2012 | Anderson | G06F 3/04895 |
| | | | | 345/633 |
| 2014/0002359 | A1* | 1/2014 | Weising | A63F 9/24 |
| | | | | 345/158 |
| 2014/0232652 | A1* | 8/2014 | Weising | G06T 19/006 |
| | | | | 345/158 |
| 2014/0235311 | A1* | 8/2014 | Weising | G06F 3/0346 |
| | | | | 463/14 |
| 2016/0214011 | A1* | 7/2016 | Weising | G09G 5/08 |
| 2017/0084051 | A1* | 3/2017 | Weising | G06T 7/20 |
| 2020/0151900 | A1* | 5/2020 | Weising | G06T 7/70 |
| 2023/0298279 | A1* | 9/2023 | Avisar | G06T 19/006 |
| | | | | 345/419 |

OTHER PUBLICATIONS

International-type search report dated Feb. 24, 2023 from AU Application No. 2022900612, 12 pages.
Rompapas, D. et al., 'Project Esky: Enabling High Fidelity Augmented Reality on an Open Source Platform', ISS '20: Companion Proceedings of the 2020 Conference onInteractive Surfaces and Spaces, pp. 61-63, https://dl.acm.org/doi/10.1145/3380867.3426220, see, for example, the abstract and sections 1 and 2.

* cited by examiner

AUGMENTED REALITY POINT OF VIEW SYNCHRONISATION SYSTEM

FIELD OF THE INVENTION

This invention relates generally to augmented reality systems and, more particularly, to a system which is able to easily and accurately synchronise a point of view of an augmented 3D model with respect to a physical model, having particular application for ultrasound visualisation training.

BACKGROUND

Augmented reality (AR) is an interactive experience that overlays computer-generated content with real world content to provide an immersive interactive experience.

As one example, Rompapas, D. et. al., 'Project Esky: Enabling High Fidelity Augmented Reality on an Open Source Platform', ISS '20: Companion Proceedings of the 2020 Conference on Interactive Surfaces and Spaces, pp 61-63, https://doi.org/10.1145/3380867.3426220, discloses as Open-Source AR modular platform capable of high fidelity natural hand interactions with virtual content, high field of view, and spatial mapping for environment interactions.

In section 2, Rompapas, D. et. al. discloses calibrating the user's viewport with a six degrees of freedom (6DOF) tracking device (such as the StereoLabs™ ZED 2™) and a hand tracking device (such as the Ultraleap Leap™ motion device) using online hand-based alignment wherein a user holds their hand in front of the leap motion tracker, which shows the virtual hand with some offset. Then the user presses a button, freezing the virtual hand in place, allowing the user to match the virtual hand's pose and orientation with their real hand. Doing this several times captures the corresponding points between the initial fingertip pose and orientation. However, while this method does work, and requires less hardware to perform, it can lead to errors due to misaligned user Input.

Rompapas, D. et. al. also discloses an alternative offline visual marker alignment approach which involves the usage of the calibration stand with an ARuCO marker (i.e. black and white markers with codes) placed in the view of all sensors. The relative pose between each sensor is computed automatically by inferring from the transform between each sensor and the detected ARuCO marker. This technique involves the use of extra hardware, but allows for an automated calculation of the required pose offsets.

US 2012/0010812 A1 (Thompson) 12 Jan. 2012 discloses a technique to calibrate positional sensors of inertial computing device by physically restraining the inertial computing device in a local positioning dock of fixed positions and orientations.

The present invention seeks to provide a way to overcome or substantially ameliorate at least some of the deficiencies of the prior art, or to at least provide an alternative.

SUMMARY OF THE DISCLOSURE

There is provided herein a system which is designed to accurately augment a point of view of a 3D virtual model with respect to a view of a physical model. An example provided herein is visualisation of a virtual 3D model of internal organs with respect to a physical model of a patient's body for ultrasound visualisation training.

Whereas the rotational and positional offsets of the physical model from the headset are unknown, the present system is able to accurately determine the rotational and positional offsets of the physical model with respect to the headset by a combination of sensed rotational and positional offsets of a controller from the headset (which are variable as the headset moves relative to the controller in 3D space) and rotational and positional offsets of the controller from the model (which are static and determinable because the cradle holds the controller at fixed and known rotational and positional offsets from the physical model).

As such, the system is able to use the sensed variable offsets between the headset and the controller and the fixed offsets between the controller and the physical model to therefore determine the effective offsets between the headset and the physical model. Furthermore, the present system is able to determine such without involving the visual hand tracking or ARuCO marker techniques taught by Rompapas, D. et. Al. neither of which relate to aligning physical models. Moreover, visual hand tracking is unsuitable for aligning physical models because small errors (on the order of 2-3°) in angular alignment can results in fairly large errors in alignment location and ARuCO marker techniques involve significant computational overhead and require additional cameras.

Whereas use of cradles to physically restrain electronic devices for positional calibration exists for other applications, such as Thompson which teaches use of a physical positioning dock having a known orientation, position and magnetic orientation (provided by an embedded magnet) to restrain a mobile phone to provide a reference for the calibration of the gyroscopic, GPS and magnetometer sensors of the mobile phone device, Thompson relies on a known location of the positioning dock to calibrate the position of the mobile phone. However, according to the present application, the position and orientation of the physical model is unknown.

Furthermore, Thompson uses the known location of a physical positioning dock to calibrate the positional sensing of the mobile phone. This is essentially the opposite procedure of the present system which senses the relative rotational and positional offsets between the headset and the controller (noting that the individual positions of the headset and controller in 3D space may be unknown) to then determine the relative rotational positional offsets between the headset and the physical model by combining the sensed variable rotational and positional offsets between the headset and the controller with the fixed and determinable rotational and positional offsets between the controller and the physical model provided by the cradle.

The controller may remain docked to the physical model for the accurate augmenting of the 3D virtual model.

However, in a preferred embodiment, the controller can be detached for normal use once the system is calibrated. In accordance with this embodiment, the user may operate the system (such as by pressing a button, or a button of another controller so as to not to physically disturb the controller) to cause the system to record the variable relative rotational and positional offsets as configured offsets.

Thereafter, the point of view of the 3D virtual model is further determined according to the configured offsets and further variable rotational and positional offsets of the headset with respect to the physical model determined using background image correlation.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
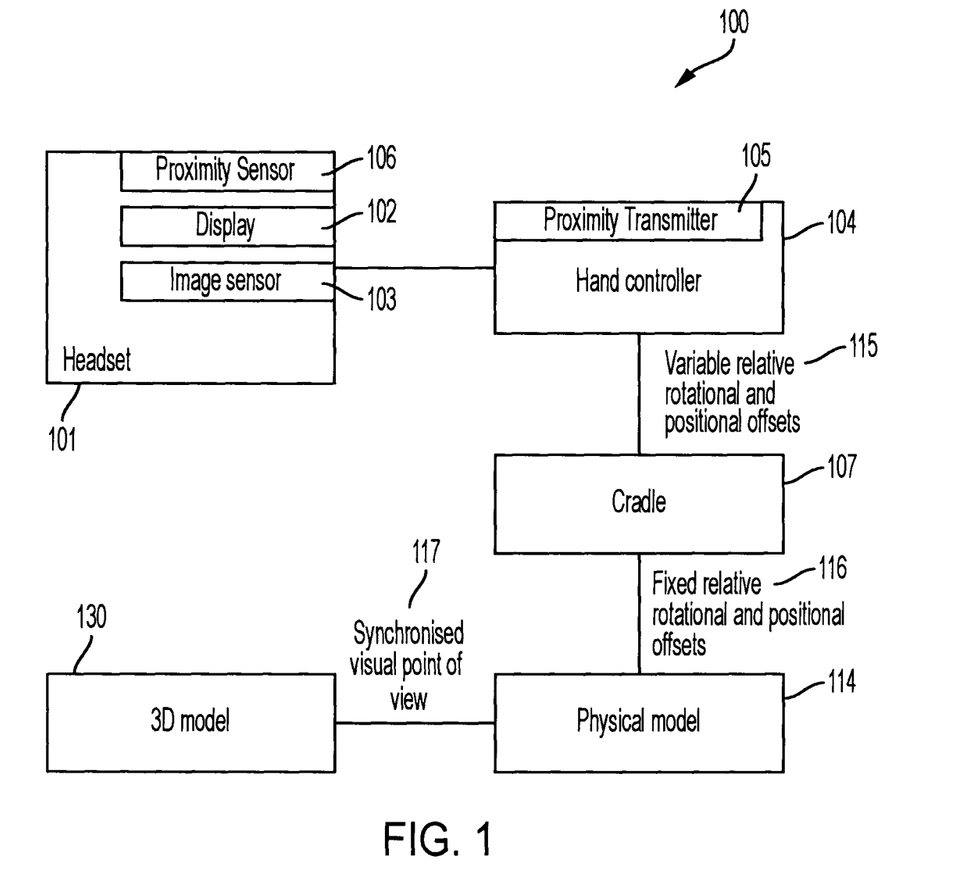
FIG. 1 shows an augmented release point of view synchronisation system in accordance with an embodiment

FIG. 1 shows an augmented reality point of view synchronisation system 100 comprising a VR headset 101 having a display 102. The display 102 may display real-world image data captured by an image sensor 103 augmented with 3D virtual models generated by the system.

The system 100 further comprises a hand controller 104 operably interfacing the headset 101.

The system 100 is configured to sense variable relative rotational and positional offsets 115 of the controller with respect to the headset 101. In this regard, the system 100 may use a system of proximity transmitters 105 and sensors 106 (such as infrared proximally transmitters and sensors) gyroscopic sensors, image correlation and the like.

Preferably, the controller 104 is a six degrees of freedom (6-DOF) controller 104 wherein the system 100 is able to determine the relative six mechanical degrees of freedom between the controller 104 and the headset, being translation in three perpendicular axes (forward/backward (surge), up/down (heave), left/right (sway)) and changes in orientation through rotation about three perpendicular axes (yaw (normal axis), pitch (transverse axis), and roll (longitudinal axis)).

The system further comprises a cradle 107 configured to position the controller 104 at fixed relative rotational and positional offsets 116 with respect to a physical model 114.

Figure 3:
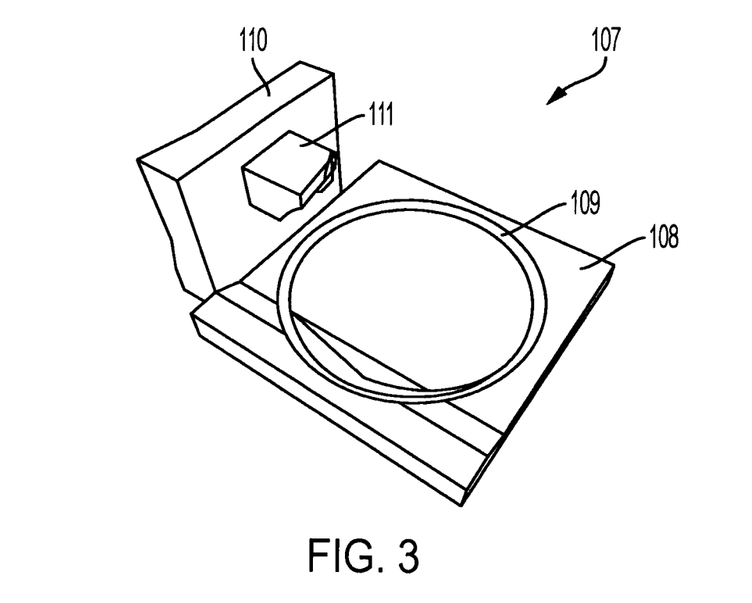
FIG. 3 illustrates a cradle of the system of FIG. 1 in accordance with an embodiment.

The cradle 107 may comprise formations conforming to the shape of the controller 104. For example, FIG. 3 shows an exemplary cradle 107 having a base 108 having an annular groove 109 and a side portion 110 from which an interlocking portion 111 extends.

Figure 5:
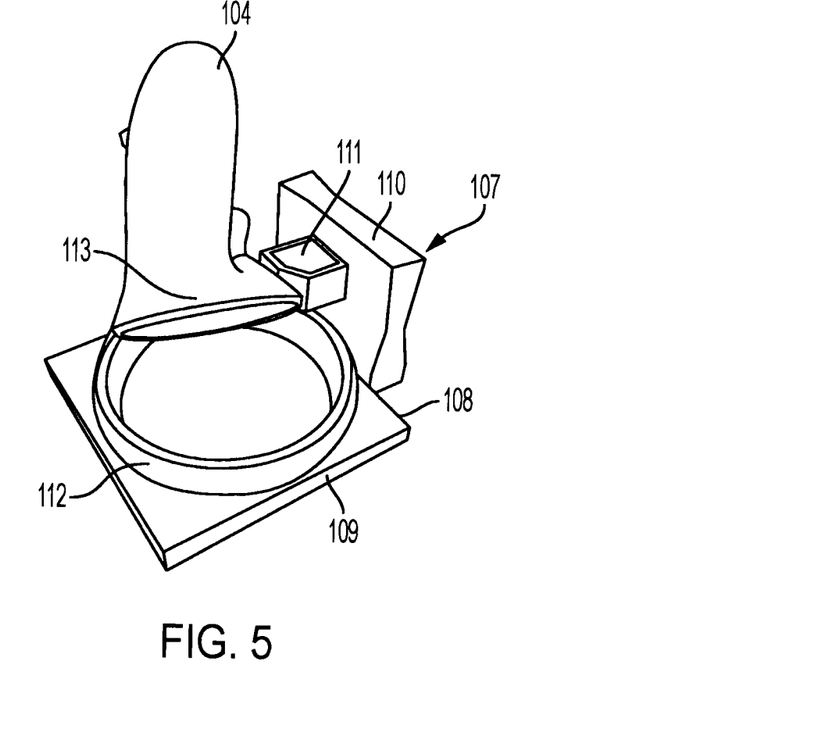
FIG. 5 illustrates the physical interconnection of a controller of the system of FIG. 1 with the cradle in accordance with an embodiment.

FIG. 5 shows how the controller 104 physically interconnects with the cradle 107. Specifically, the annular groove 109 may seat an annular ring 112 of the controller 104 and the interlocking portion 111 may physically reference a body 113 of the controller 104.

Figure 4:
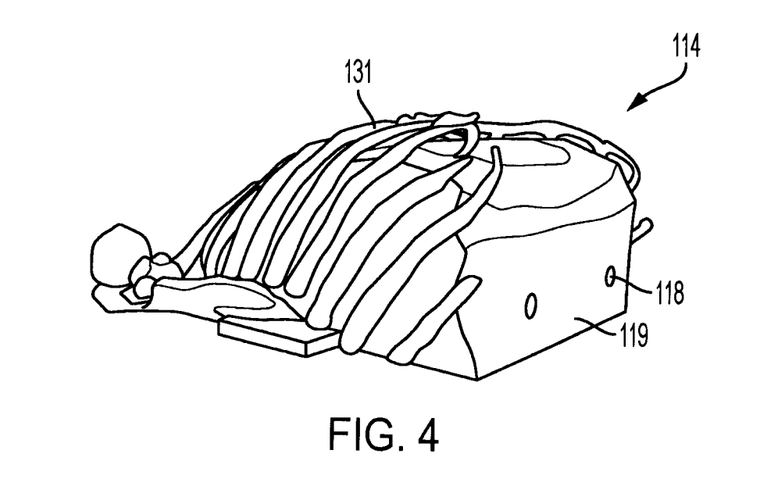
FIG. 4 illustrates a physical model of the system of FIG. 1 in accordance with an embodiment.

Furthermore, the cradle 107 and the physical model 114 may have interlocking formations. For example, FIG. 4 shows an exemplary physical model 114 comprising an interlocking formation aperture 118. The cradle 107 may comprising a corresponding protrusion behind the side portion 110 which inserts into the interlocking formation aperture 118 to position the cradle 107 in the fixed rotational and positional invariant cradle specific position 116.

Figure 6:
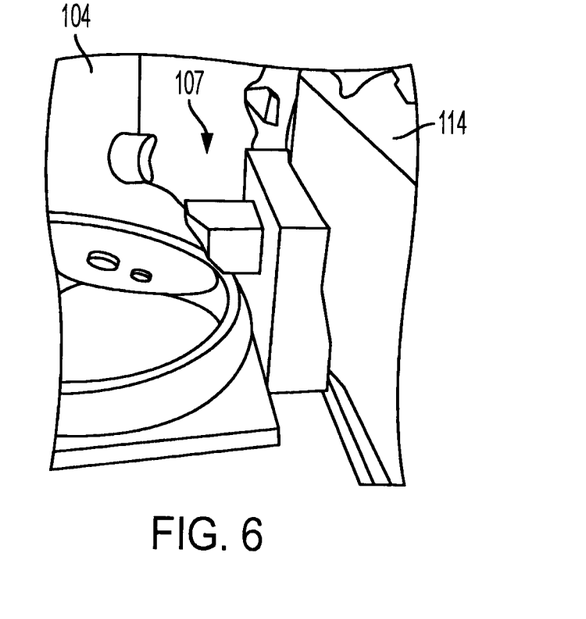
FIG. 6 illustrates the physical interconnection of the cradle with the physical model in accordance with an embodiment.

In embodiments, the shape of the cradle 107 may conform to the shape of the physical model 114. For example, as is shown in FIG. 6, the side 119 of the physical model 114 may be bevelled and, in this regard, the side wall 110 of the cradle 107 may be conformably contoured.

Figure 11:
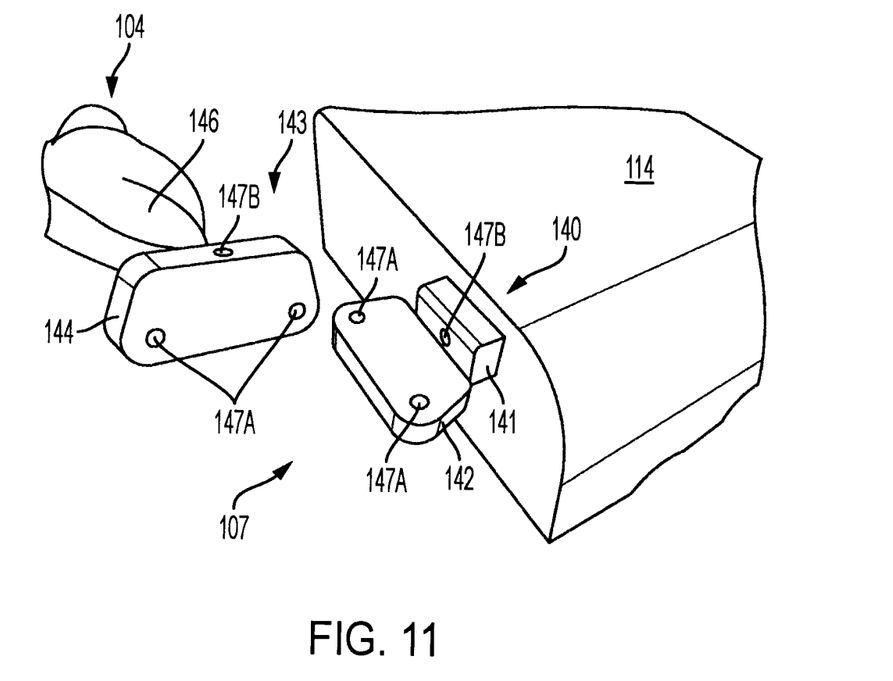
FIGS. 11 and 12 show a magnetic cradle in accordance with an embodiment.

FIG. 11 shows an embodiment wherein the cradle 107 comprises a physical model piece 140 attached to the physical model 114. The physical model piece 140 may comprise a vertical piece 141 and a horizontal piece 142 defining an upward facing platform.

The cradle 107 may further comprise a controller piece 143 having a horizontal piece 144 and a vertical piece 145. The vertical piece 145 may insert into the battery compartment 146 of the controller 104 and the horizontal piece 144 may define a downward facing platform. The controller piece 143 may attach to the controller 104 and other manners, such as by conforming to the exterior shape thereof.

Figure 12:
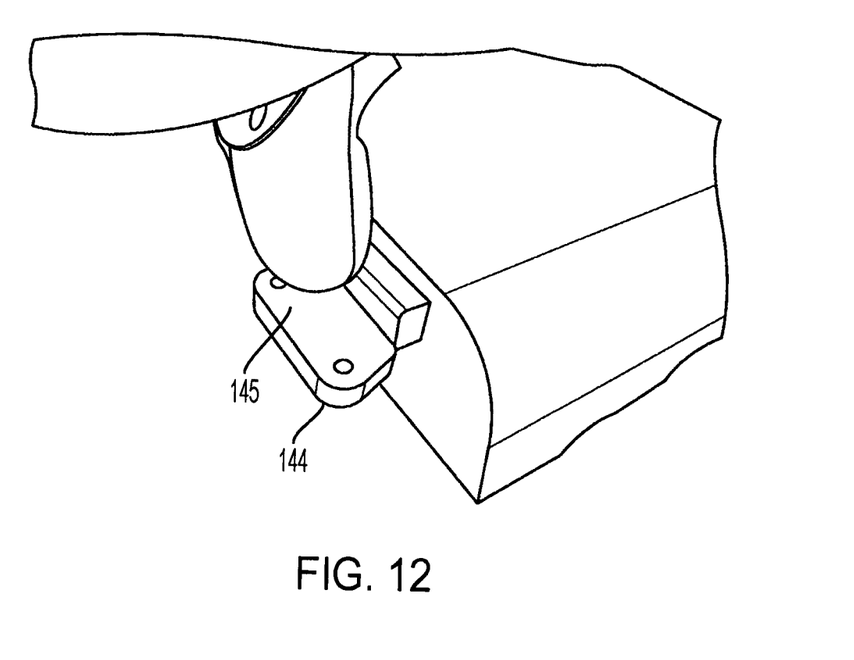

The pieces 140, 143 may retain corresponding magnets 147 which magnetically attracted to hold the pieces 140, 143 together as is shown in FIG. 12.

The magnets 147 may operate orthogonally. Specifically, the magnets 147 may comprise vertically acting magnets 147A and horizontally acting magnets 147B which restrain the controller 104 with reference to the physical model 114 both vertically and horizontally.

Figure 2:
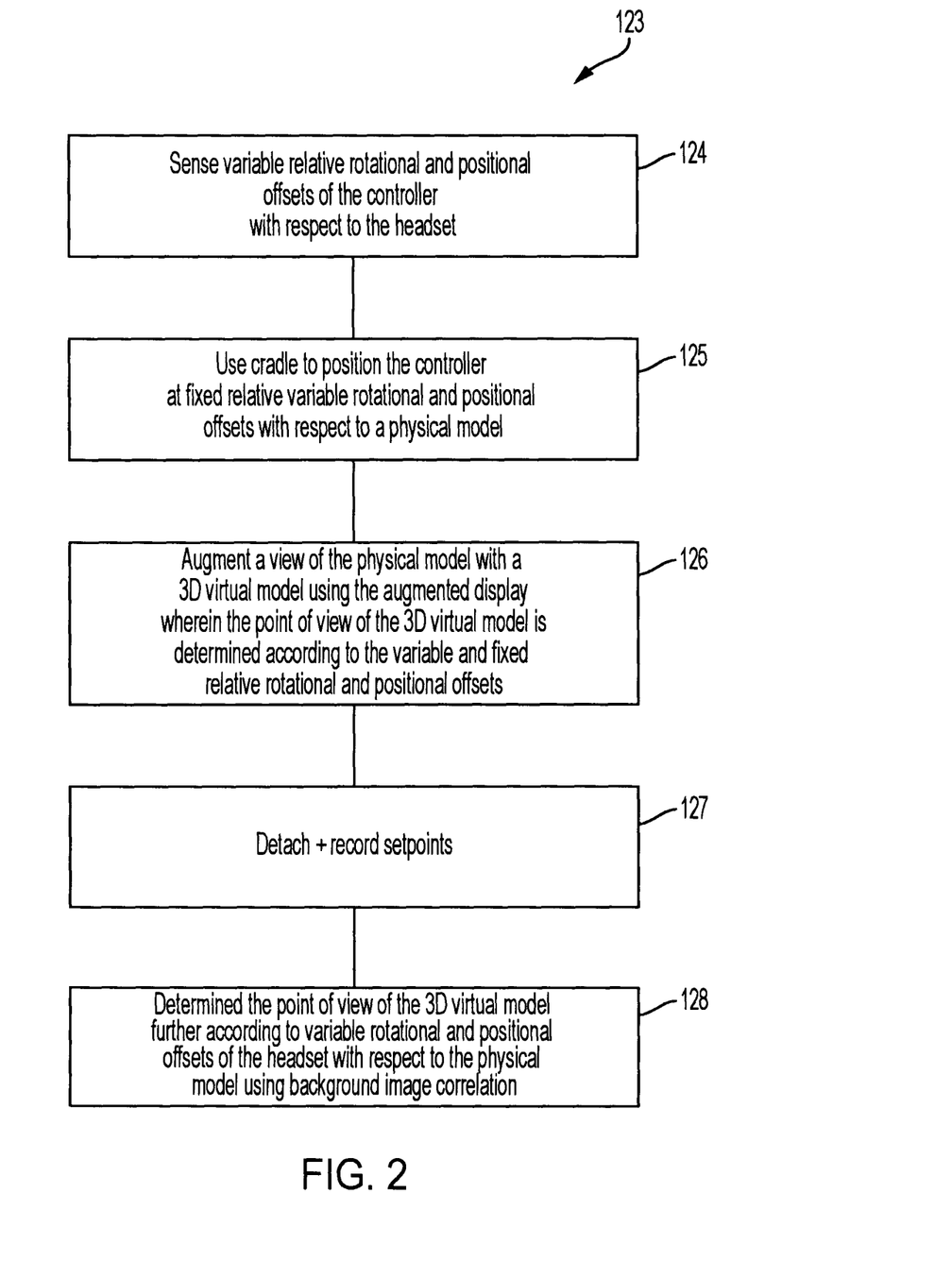
FIG. 2 illustrates exemplary processing of the system of FIG. 1.
Figure 7:
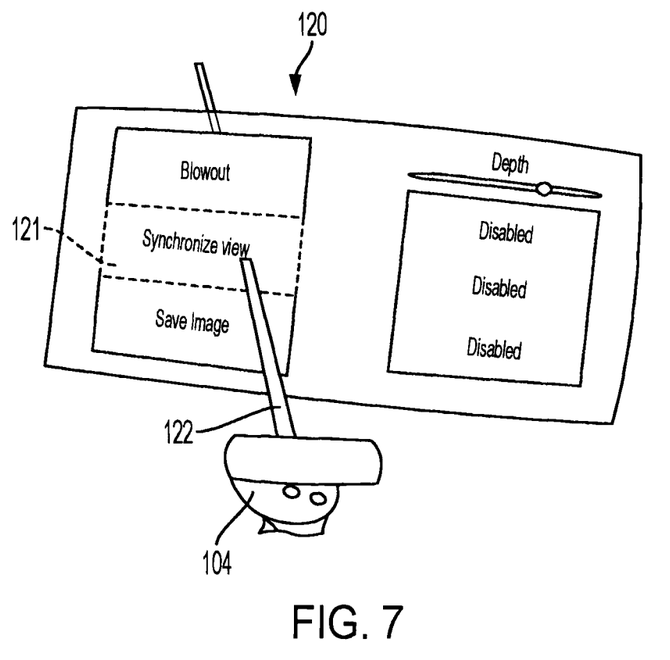
FIGS. 7-10 illustrate the steps of a synchronisation process to visually align 3D model with the physical model.

FIG. 2 illustrates exemplary use 123 of the system wherein, at step 124 the system 100 is configurable in a synchronisation mode. FIG. 7 illustrates an exemplary augmented menu 120 having a synchronisation option 121 selectable by a virtual pointer 122 of the controller 104.

The fixed relative rotational and positional offsets 116 may be configured, including via the menu 120. In embodiments, the system 100 records a number of types of cradles 107 and corresponding fixed relative rotational and positional offsets 116 for each. As such, selection of a type of cradle 107 may allow the system 100 to retrieve the applicable fixed relative rotational and positional offsets 116.

Once configured in the synchronisation mode, the system 100 senses the variable relative rotational and positional offsets 115 of the controller 104 with respect to the headset 101.

Figure 8:
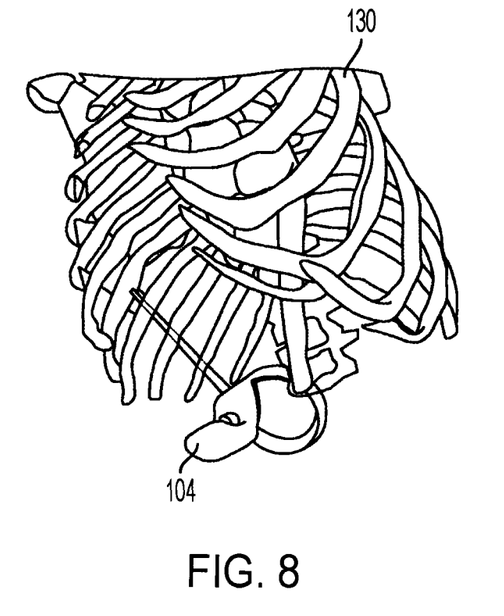

FIG. 8 shows the system 100 augmenting a virtual 3D model 130 according to the measured variable relative rotational and positional offsets 115 wherein the 3D model 130 appears attached to the controller 104.

Figure 9:
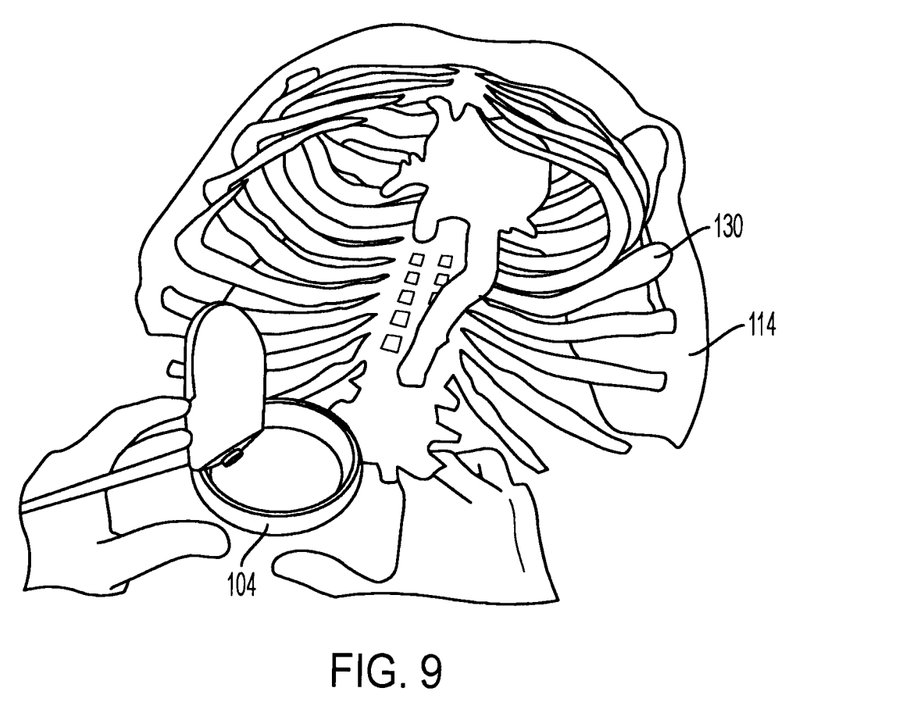

As shown in FIG. 9, at step 124 the user uses the cradle 107 to position the controller 104 at the fixed relative rotational and positional offset 116 with respect to the physical model 114.

At step 126, the system 100 uses the display 102 of the headset 101 to augment a view of the physical model 114 with the 3D virtual model 130 wherein the point of view of the 3D virtual model is determined according to both the variable relative rotational and positional offsets 115 and the fixed relative rotational and positional offsets 116, shown as the synchronised visual point of view 117 in FIG. 1.

For example, where the cradle 107 holds the controller 104 at rotational offsets of 3°, 92° and 87° with respect to the physical model 114 and positional offsets of 3.1 cm, 7.9 cm and 4.7 cm, if the system 100 determines that the variable relative rotational offsets are −3°, 10° and −80° and that the variable relative positional offsets are 309.1 cm, 78.9 cm and 403.7 cm, the system 100 can therefore determine that the physical model 114 has relative rotational offsets of 0°, 102°, 7° and positional offsets of 312.2 cm, 86.8 cm and 408.4 cm with respect to the headset 101.

The controller 104 may be left attached to the physical model 114 wherein the system 100 continually augments the point of view of the 3D virtual model 130 according to the variable and fixed relative rotational and positional offsets 115, 116.

However, at step 127, the controller 104 may be detached from the cradle 107 for use. The user may press a button on the controller 104 prior detachment so that the system 100 records the current variable relative rotational and positional offsets 115 as configured offsets. Preferably, the user presses a button of another controller 104 so as to not to physically disturb the positioning and orientation of the controller 104.

At step 128, the system 100 further determines the point of view of the 3D virtual model 130 according to further variable rotational and positional offsets of the headset 101 with respect to the physical model 114 using image correlation. In other words, once the system 100 has obtained the setpoints using the controller 104, the system 100 may thereafter determine relative positioning of the physical model 114 with reference to the headset 101 by performing image correlation on image data obtained by the image sensor 103 of the headset 101 to determine relative movement of the headset 101 with respect to the physical model 114. The image correlation may be used to determine both panning motion (i.e., moving up and down or sideways) and distance (i.e., moving closer to or further away from the physical model 114).

Figure 10:
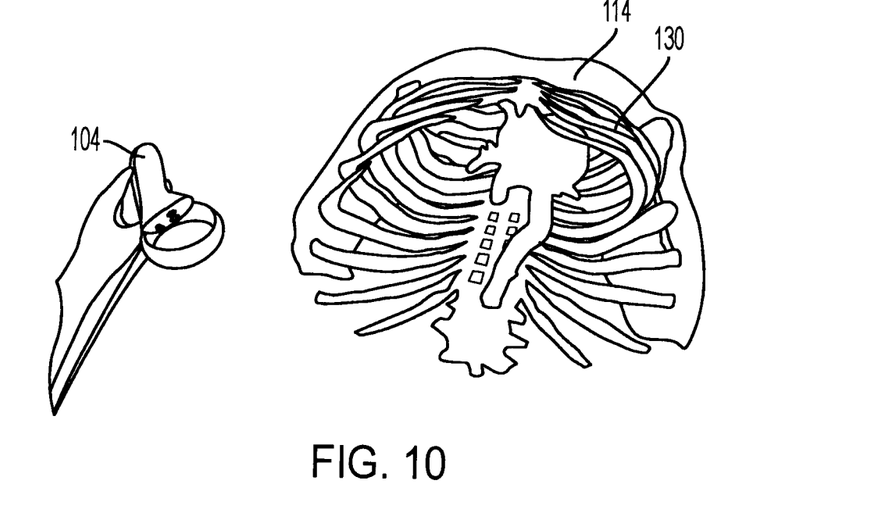

As such, as shown in FIG. 10, the system 100 augments the 3D model 130 using the display 102 wherein the point of view of the 3D virtual model 130 is determined according to the variable and fixed relative rotational and positional offsets 115 and 116 and further according to variable rotational and positional offsets of the headset 101 with respect to the physical model 114 using background image correlation.

As shown in FIG. 4, the physical model 114 comprises an exterior surface 131 and the 3D virtual model 130 may be sized and shaped to conform with the exterior surface 131.

Specifically, in the example shown, the physical model 114 is a manikin representing the chest of a patient and may comprise a silicon or rubber overlay to simulate soft tissue. In this regard, the 3D model 130 may represent the internal chest organs and bone structures of the patient.

As shown in FIG. 10, the system 100 may display the 3D model 130 with reference to the physical model 114 so that the 3D model 130 appears to be within side the physical model 114 so that the user can visualise the size and positioning of the internal organs.

In embodiments, the aforedescribed headset 101 and controller 104 may be a commercially available virtual reality headset, such as the a virtual reality headset developed by Oculus™, programmatically controllable to augment the view of the physical model 114 with the 3D virtual model 103 using the augmented display 102 by calculating the point of view of the 3D virtual model 130 to the variable and fixed relative rotational and positional offsets and calculating the further variable rotational and positional offsets of the headset 101 with respect to the physical model 114 determined using background image correlation.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

It should be noted that no limitation should necessarily be imputed to the embodiments described herein with reference to the terminology "augmented" in that the present apparatus and methodology can equally applied to "virtual reality" wherein the entire background is rendered by the system 100 (such as wherein, for example, the system 100 renders a body of a patient in a simulated virtual hospital environment, including using background information obtained from the image sensor 103) as opposed to augmented reality which overlays an actual field of view.

The invention claimed is:

1. An augmented reality point of view synchronisation system comprising:
   a VR headset having an augmented display;
   a controller operably interfacing the headset, the system configured to sense variable relative rotational and positional offsets of the controller with respect to the headset;
   a cradle configured to position the controller at fixed relative rotational and positional offsets with respect to a physical model, wherein the system is configured to augment a view of the physical model with a 3D virtual model using the augmented display, wherein the point of view of the 3D virtual model is determined according to the variable and fixed relative rotational and positional offsets.

2. The system as claimed in claim 1, wherein the system is configured to record the variable relative rotational and positional offsets as configured offsets whereafter the point of view of the 3D virtual model is further determined according to the configured offsets and further variable rotational and positional offsets of the headset with respect to the physical model determined using background image correlation.

3. The system as claimed in claim 2, wherein the system further comprises a further controller and wherein the system is configured to record the configured offsets responsive to operation of the further controller.

4. The system as claimed in claim 1, wherein cradle comprises formations conforming to the shape of the controller.

5. The system as claimed in claim 1, wherein the cradle and the physical model have interlocking formations.

6. The system as claimed in claim 1, wherein a shape of the cradle conforms to a shape of the physical model.

7. The system as claimed in claim 1, wherein the cradle comprises a physical model piece which interconnects with a controller piece.

8. The system as claimed in claim 7, wherein the pieces interconnect magnetically.

9. The system as claimed in claim 8, wherein the pieces comprise pairs of orthogonally orientated magnets.

10. The system as claimed in claim 7, wherein the controller piece interfaces a battery compartment of the controller.

11. The system as claimed in claim 1, wherein the physical model comprises an exterior surface and wherein the 3D model is sized and shaped to conform with the exterior surface.

12. The system as claimed in claim 1, wherein the 3D model is displayed to appear within the exterior surface.

13. A method of augmenting a view of a physical model with a 3D virtual model using the system as claimed in claim 1, the method comprising positioning the controller with respect to the physical model using the cradle wherein the system senses the variable relative rotational and positional offsets of the controller with respect to the headset and wherein the point of view of the 3D virtual model is determined according to the variable and fixed relative rotational and positional offsets.

14. The method as claimed in claim 13, wherein the method further comprises operating the system to record the variable relative rotational and positional offsets as configured offsets and detaching the controller from the cradle, whereafter the point of view of the 3D virtual model is further determined according to the configured offsets and further variable rotational and positional offsets of the headset with respect to the physical model determined using background image correlation.

15. The method as claimed in claim 14, wherein the method comprises operating a further controller to cause the system to record the configured offsets.

16. The method as claimed in claim 14, further using the system as claimed in claim 8, wherein the method further comprises magnetically attaching the pieces.

17. The method as claimed in claim 14, wherein the method comprises inserting the controller piece into a battery compartment of the controller.

* * * * *